March 10, 1970   W. M. DOYLE ET AL   3,500,233
FREQUENCY MODULATED LASER DEVICE
Filed July 29, 1965

INVENTORS
WALTER M. DOYLE
MATTHEW B. WHITE
BY
ATTORNEY 3,500,233
FREQUENCY MODULATED LASER DEVICE
Walter M. Doyle, Laguna Beach, and Matthew B. White, Newport Beach, Calif., assignors to Philco-Ford Corporation, a corporation of Delaware
Filed July 29, 1965, Ser. No. 475,757
Int. Cl. H01s 3/00
U.S. Cl. 331—94.5                                     8 Claims

ABSTRACT OF THE DISCLOSURE

A laser system comprising a discharge tube shaped so as to permit generation of a plurality of oscillation signals which have respectively different frequencies and different planes of polarization, and a light transmissive device which exhibits a signal-controlled anisotropy and through which light generated within the discharge tube (i.e., the oscillation signals) is passed. The light transmissive device, which can be a test sample, is responsive to an input signal to change the difference in the respective frequencies of the differently polarized oscillation signals exiting the laser.

---

The present invention relates to dual polarization laser devices and more particularly to means for deriving or transmitting intelligence by means of dual polarization laser systems.

It has been suggested that communication by laser beams is possible by modulating the overall length of the optical cavity of a laser thereby to frequency modulate the laser beam. However, such systems are subject to the disadvantage that careful control of the length of the cavity must be maintained if a fixed "carrier" frequency is to be maintained. Also, special precautions must be taken to prevent vibration of the optical cavity since such vibration tends to change the length of the optical cavity and creates spurious noise frequency modulation of the laser beam.

Recently lasers have been developed in which anti-reflection coated windows oriented substantially perpendicular to the discharge tube axis are employed instead of the more conventional discharge tubes with Brewster angle windows. Such lasers, when provided with external reflectors, are capable of supporting oscillations of any polarization.

We have discovered that lasers of the type described are extremely sensitive to intra-cavity optical anisotropy. More specifically it has become evident that laser mode frequencies are highly sensitive to birefringence, optical activity, electro-optic and magneto-optic effects when these effects appear in an optical element inside a laser cavity.

It is an object of the present invention to employ this sensitivity of the laser system to intra-cavity optical anisotropy to provide a dual polarization laser system which is capable of deriving or transmitting intelligence with great accuracy.

Another object is to employ this sensitivity of the laser system to intra-cavity optical anisotropy to provide an improved dual polarization communication system.

A further object is to provide a simple dual frequency laser FM communication system which is relatively insensitive to the deleterious noise effects introduced by vibrations of the optical cavity or by atmospheric fluctuations.

Still another object is to provide a dual polarization laser system capable of supplying precise information concerning the optical properties of a substance in terms of frequency modulation of a plurality of coexisting beams in a laser cavity.

In general, these and other objects of the present invention are achieved by a laser system comprising two or more reflectors which establish a closed optical path therebetween, a discharge tube disposed in said path and shaped so as not to favor a particular axial mode of oscillation, optical transmissive means disposed in said path of optical energy between said reflectors, said means introducing anisotropy of known or unknown characteristic in response to an applied signal, and means for supplying a signal to said last-mentioned means to alter the optical characteristics of said optical transmissive means. Means may also be provided for detecting and measuring the signals produced by said laser system.

For a better understanding of the present invention together with other and further objects thereof reference should now be had to the following detailed description which is to be read in conjunction with the accompanying drawings in which.

Figure 1:
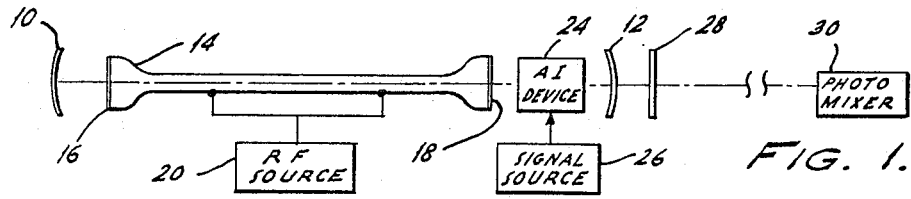
FIG. 1 is a schematic diagram of the present invention.

In FIG. 1 two spherical reflectors define the ends of an optical path extending therebetween. A laser tube 14 is disposed in this path. Typically laser tube 14 may comprise a plasma tube having fused silica windows 16 and 18 which are normal or nearly normal to the optical path between reflectors 10 and 12. The end windows 16 and 18 may be anti-reflection coated if necessary in order to reduce optical losses within the laser system. Windows 16 and 18 may be oriented at a slight angle to the normal, i.e. displaced by a few degrees, for example 2°, from the normal in order to minimize resonance between the two windows 16 and 18 as a result of partial reflections therefrom. Plasma tube 14 may include a mixture of helium and neon and conveniently the system may operate at the 1.15 micron He-Ne transition. Oscillation may be limited to axially symmetric mode by means of a light shield (not shown) having a small aperture aligned with optical path between reflectors 10 and 12. The internal surface of tube 14 may be frosted to minimize specular reflection from the walls of tube 14.

A conventional RF pumping source 20 may be coupled to plasma tube 14 in a conventional manner.

Figure 2:
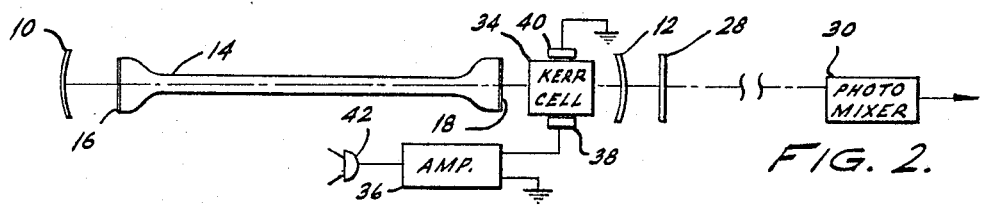
FIG. 2 is a diagram similar to FIG. 1 showing one preferred form of dual polarization communication system.

Block 24 represents schematically an optical transmissive device which is arranged to introduce an optical anisotropy into the optical path in response to a signal supplied by source 26. In the case of a communications system, device 24 may comprise, for example, a Kerr cell or Pockels cell which introduces a known anisotropy in response to an electrical signal supplied thereto from source 26. Source 26 may be a signal amplifier. Such a system is illustrated in FIG. 2. In those embodiments of the invention arranged to function as a laser refractometer, device 24 may comprise a specimen of unknown optical characteristics. The specimen may be stressed electrically, mechanically or magnetically or in a plurality of such ways in succession, by signals supplied by source 26.

Reflector 12 is preferably slightly transmissive, for example 5% transmissive, so that some energy exits through this reflector and passes through a polarization analyzer 28 which may be a Nichol prism. The light passing through analyzer 28 is intercepted by a photomixer 30. If the system of FIG. 1 is adapted for intelligence signal transmission, photomixer 30 may comprise the input portion of a remote receiver. If, on the other hand, the system of FIG. 1 is adapted to operate as a refractometer, photomixer 30 comprises the input to the frequency analyzer portion of the system.

FIG. 2 shows an embodiment of the invention employing a Kerr cell 34 coupled to the output of amplifier 36 by way of electrodes 38 and 40 whereby the system operates as a frequency modulation communication system. Parts in FIG. 2 corresponding to like parts in FIG. 1 have been identified by the same reference numerals. In order to simplify the drawings, the RF source 20 shown in FIG. 1 is not shown in the other figures. A microphone 42 diagrammatically represents an information input to amplifier 36.

When a high DC voltage is applied between plate 38 and 40, as by direct coupling the anode of the final stage of amplifier 36 directly to plate 38, the only stationary modes that can be established involve light plane-polarized either perpendicular to or parallel to the field direction. Light polarized in any other manner cannot simultaneously maintain its polarization state and fulfill the condition for constructive interference necessary for a stationary mode.

The beam having a polarization parallel to the direction of the field will have a velocity through the Kerr cell 34 which is different from the velocity of the beam having a polarization perpendicular to this field. This difference in velocity will result in a difference in effective path length of the two beams and hence a difference in frequency between the beam polarized parallel to the field and the beam polarized perpendicular to the field. In a typical system having a physical spacing between reflectors 10 and 12 of 120 centimeters and a nitrobenzene Kerr cell of 4 centimeters length with a .5 centimeter spacing between the electrodes, an applied voltage of 12 kilovolts will result in a difference in frequency between the two beams of approximately 70 megacycles per second.

Changes in the potential applied to the Kerr cell and similar electro-optic devices will have a different effect on the velocity of the beam having a polarization parallel to the electric field than it has on the velocity of the beam having a polarization perpendicular to the electric field. Thus modulation of the difference between the frequency of the parallel-polarized beam and that of the perpendicular-polarized beam may be obtained by modulation of the potential applied between electrodes 38 and 40. It can be shown that this frequency difference is proportional to the square of the voltage applied to the Kerr cell. Thus a modulating voltage having an amplitude of approximately 85 volts is sufficient to produce a frequency excursion of the order of 1 megacycle per second in a system having the parameters mentioned above.

After passage through reflector 12 and polarizer 28, which preferably is oriented at 45° with respect to the planes of polarization of the two waves, the beat note obtained by the optical heterodyning of the two coherent, parallel light beams leaving polarizer 28 will yield a component at the modulation frequency applied to electrodes 38 and 40. This optical heterodyning can be accomplished by photomixer 30 which may comprise a conventional photo-diode such as an InAs photodetector.

Thus an intelligence signal supplied by microphone 42 and amplifier 36 to the plates 38 and 40 may be detected by a remote receiver having as its input the photodetector 30.

Since the average frequency of the beat note between electrodes 38 and 40 can be stabilized, the remote receiver can be modified to include further a discriminator having a fixed center frequency equal to this average difference in frequency. The modulation component will then be recovered from the output of the discriminator.

It will be recognized that the system just described has the advantages of intercarrier operation such as employed, for example, in the detector of the sound signal in a television receiver.

The beat signal between the two beams is relatively independent of minor changes in physical spacing between reflectors 10 and 12 such as may result from the vibration of one or both of these reflectors. If desired, the average frequency of the beat note may be stabilized at the transmitter by sampling the two transmitted beams, detecting the frequency of the beat and then using this information to control the DC bias applied between electrodes 38 and 40 to maintain the beat frequency constant.

Figure 3:
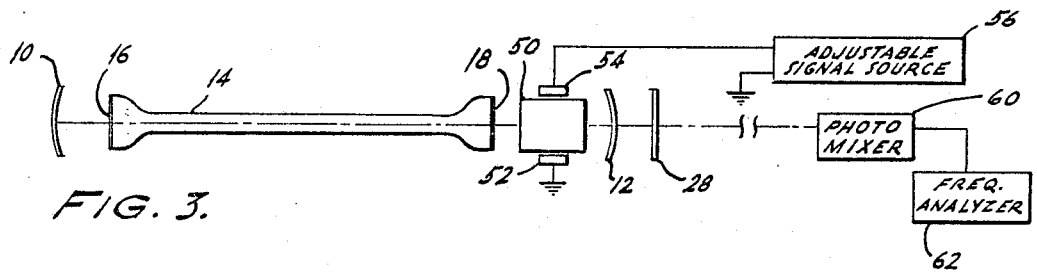
FIG. 3 illustrates a laser refractometer for measuring the electro-optic properties of a sample.

FIG. 3 illustrates an embodiment similar to that of FIG. 2 except that the Kerr cell has been replaced by a test specimen 50, such as glass having unknown optical properties. Electrode 52 may be formed to provide mechanical support for the test specimen. A second electrode 54 is provided so that an electric field may be created within test specimen 50. Adjustable signal source 56 is adapted to provide a bias voltage of known amplitude which may be controlled over a preselected range in order that the optical properties of test specimen 50 may be determined for various electric field intensities.

The optical resonance within the system of FIG. 3 depends both on the amount of the birefringence and the optical rotation. It can be shown that the frequency splitting $\Delta \nu$ introduced by the test specimen is given by the equation $$\Delta \nu = \frac{c}{2\pi d} \cos^{-1} (\cos 2\theta \cos 2\phi) \quad (1)$$

where $c$ is the velocity of light, $d$ is the average optical path length of the covity $\theta$ is the single pass angle of polarization rotation and $2\phi$ is the relative phase shift of two mutually perpendicularly polarized waves.

The amplitude of the cross polarization beat B, as observed after passing through polarization analyzer 28, has a maxima and minima yielding the ratio $$\frac{B \text{ min.}}{B \text{ max.}} = \frac{1+p^2}{2p} \quad (2)$$

where $$p = \frac{\sin 2\theta}{(1 - \cos^2 2\theta \cos^2 2\phi)^{1/2} + \cos 2\theta \sin 2\phi} \quad (3)$$

Both $\Delta \nu$ and B are measurable by means of photodetector 60, which may be identical to photodetector 30, and a frequency analyzer 62 coupled to the output of photodetector 60. Analyzer 62 may be any conventional analyzer circuit capable of measuring the frequency and amplitude of selected components of a composite wave.

Polarization analyzer 28 may be made rotatable and a scale means (not shown) provided so that the actual plane of polarization of the exiting wave may be determined along with the differential shift in the plane of polarization of the two modes.

Figure 4:
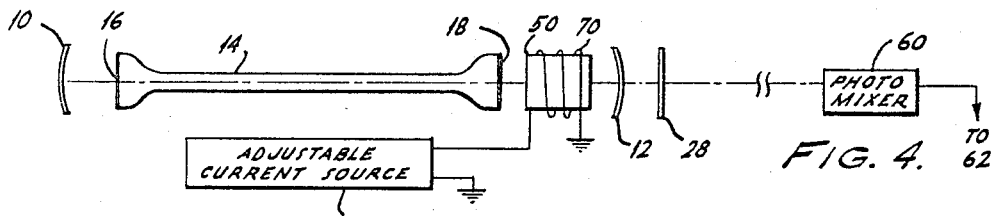
FIG. 4 shows a refractometer for measuring the magneto-optic properties of a sample.

The embodiment of FIG. 4 differs from the embodiment of FIG. 3 in the substitution of an induction coil 70 for the electrodes 52 and 54 in order that the test specimen 50 may be subjected to a magnetic field rather than an electric field.

Figure 5:
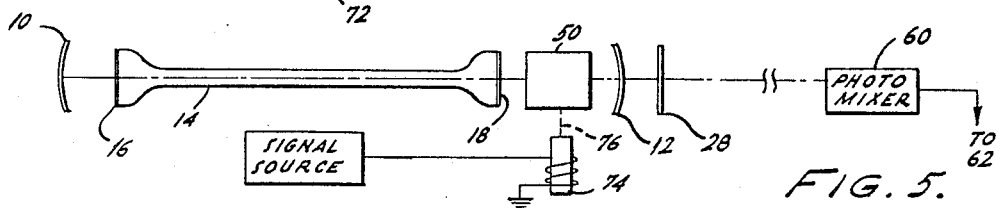
FIG. 5 illustrates still another embodiment for measuring stress-induced optical anistropy of a sample.

FIG. 5 illustrates an embodiment in which a test specimen 50 is subjected to mechanical stress by means of an electromechanical transducer 74. The coupling between transducer 74 and test specimen 50 is illustrated schematically in FIG. 5 by the broken line 76. Thus, by employing one or more of the embodiments shown in FIGS. 3–5, precise information about the electro-optic and magneto-optic characteristics and natural and stress induced birefringence and optical activity of a sample 50 may be obtained.

It has been found in practice that an index of refraction difference in the X and Y directions of the sample as low 1 part in $10^{10}$ is measurable. This represents an increase in precision of the order of about $10^4$ over conventional interferometric methods. Similarly, the precision in measurement of optical rotation is increased of the order of $10^2$ while similar increases in precision of the measurement of birefringence, and other optical properties is obtained.

Figure 6:
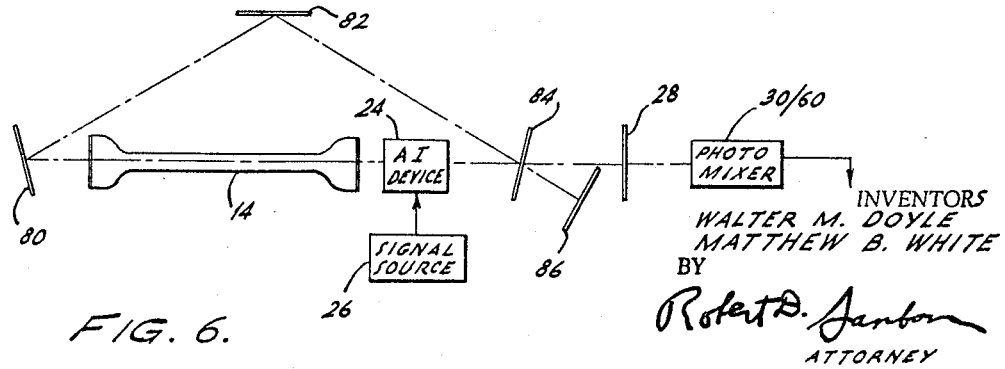
FIG. 6 is a diagrammatic showing of an embodiment of the invention employing three reflectors to define the optical path.

The embodiment of FIG. 6 is similar to that of FIG. 1 with the exception that three reflectors 80, 82 and 84 are employed to define the optical path. Again in this embodiment modes will be present which have different polarizations within the sample. Light circulating in the optical loop in opposite directions may be extracted from said loop by the reflector arrangement 84 and 86 which is described in detail in the copending application of Matthew B. White Ser. No. 466,389, filed June 23, 1965. Any of the means for applying electric, magnetic or mechanical stresses shown or described in connection with the embodiments of FIGS. 3–5 may be employed in the embodiment of FIG. 6.

What is claimed is:

1. A laser system comprising a plurality of reflectors positioned to define a closed optical path, at least one of said reflectors being partially transmissive whereby oscillation signals can exit said path, a laser plasma tube positioned between a pair of said reflectors with its longitudinal axis substantially coincident with said path, said plasma tube having windows intersecting said path and oriented within a few degrees of 90 degrees with respect to said path so as to permit generation of a plurality of oscillation signals which have respectively different frequencies and different planes of polarization, means for pumping said plasma tube, light transmissive means positioned in said optical path, said light transmissive means exhibiting a signal controlled anisotropy whereby only oscillation signals having mutually orthogonal planes of polarization can exist in said path, and means coupled to said light transmissive means to alter the optical anisotropy exhibited by said light transmissive means whereby the frequency difference between the oscillation signals existing in said path is changed.

2. The laser system of claim 1 further comprising a polarization analyzer positioned to intercept oscillation signals exiting said path through said partially transmissive reflector and oriented to transmit light polarized at an angle intermediate the respective angles of polarization of the oscillation signals exiting said path.

3. The laser system of claim 2 wherein said means coupled to said light transmissive means to alter its optical anisotropy comprises a source of a mechanical, electrical or magnetic signal.

4. The laser system of claim 1 wherein said closed optical path is defined by at least three reflectors positioned in a non-linear array whereby oscillation signals exiting said path through said partially transmissive reflector follow first and second paths externally of said path, and further comprising means positioned externally of said path to cause oscillation signals following said second path to follow substantially said first path.

5. The laser system of claim 1 wherein said light transmissive means is a Kerr cell.

6. The laser system of claim 1 wherein said light transmissive means is a Pockels cell.

7. A laser refractometer comprising a plurality of reflectors positioned to define a closed optical path, at least one of said reflectors being partially transmissive whereby oscillation signals can exit said path, a laser plasma tube positioned between a pair of said reflectors with its longitudinal axis substantially coincident with said path, said plasma tube having windows intersecting said path and oriented within a few degrees of 90 degrees with respect to said path so as to permit generation of a plurality of oscillation signals which have respectively different frequencies and planes of polarization, means for pumping said plasma tube, means for positioning an optically transmissive sample to be tested in said path, means for altering the optical properties of said optically transmissive sample, a photomixing detector positioned to intercept the oscillation signals exiting said path through said partially transmissive reflector, a linear polarizer positioned intermediate said detector and said partially transmissive reflector, and frequency analyzer means coupled to said photomixing detector.

8. The system of claim 7, wherein said closed optical path is defined by at least three reflectors positioned in a non-linear array whereby oscillation signals exiting said path through said partially transmissive reflector follow first and second paths externally of said path, and further comprising means positioned externally of said path to cause oscillation signals following said second path to follow substantially said first path.

References Cited

UNITED STATES PATENTS

| | | | |
|---|---|---|---|
| 3,243,722 | 3/1966 | Billings | 331—94.5 |
| 3,277,393 | 10/1966 | Nicolai | 331—94.5 |
| 3,277,396 | 10/1966 | Statz et al. | 331—94.5 |
| 3,373,650 | 3/1968 | Killpatrick | 331—94.5 |

OTHER REFERENCES

Mielenz et al., He-Ne with Perpendicular End Windows, Applied Optics, vol. 3, p. 785, June 1964.

Macek et al., Measurement of Fresnel Drag with Ring Laser, Jour. Appl. Phys., vol. 35, 1964, pp. 2556–7.

Wide-Band Optical Frequency Translation, Kerr, T. R., Proc. of IEEE, May 1965, p. 497.

RONALD L. WIBERT, Primary Examiner

V. P. McGRAW, Assistant Examiner

U.S. Cl. X.R.

250—199; 356—128